H. TODD.
Seed Planter.
No. 3,381.
Patented Dec. 15, 1843.
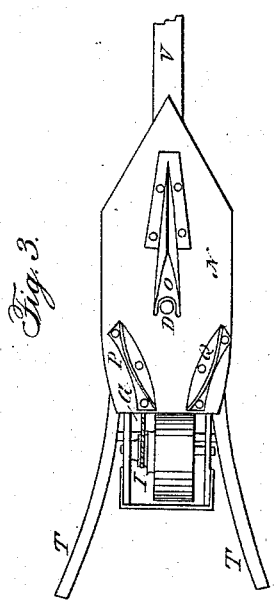
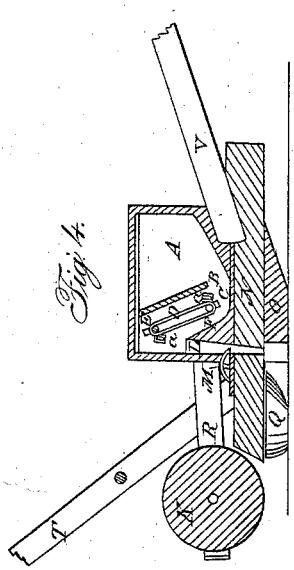
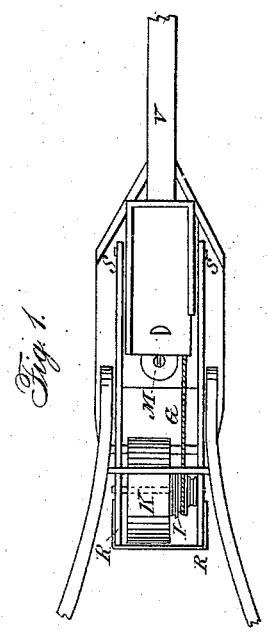
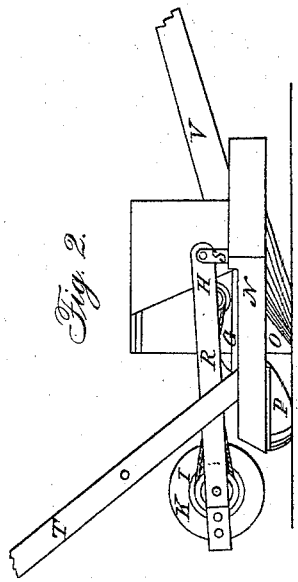

UNITED STATES PATENT OFFICE.

HENRY TODD, OF OXFORD, NEW HAMPSHIRE.

IMPROVEMENT IN SEED-PLANTERS.

Specification forming part of Letters Patent No. 3,381, dated December 15, 1843.

*To all whom it may concern:*

Be it known that I, HENRY TODD, of Oxford, in the county of Grafton and State of New Hampshire, have invented certain new and useful Improvements in Machinery for Drilling or Planting Corn and Seeds in general, of which the following description and accompanying drawings, taken together, constitute a full and exact specification.

Figure 1 of the above-mentioned drawings represents a top view of my improved planting-machine. Fig. 2 is a side elevation. Fig. 3 is a bottom view, and Fig. 4 is a longitudinal vertical and central section, of the same.

My first improvement consists in the peculiar mechanism for receiving the seeds and discharging them into the furrow made by the furrow-opener or plow, and for this purpose a chamber or hopper, A, Fig. 4, is provided for the reception of the seed to be planted. This chamber communicates by a passage or opening, B, (in its lower part,) with a supplying-chamber, C, arranged in rear thereof, as seen in the drawings. Within this latter chamber an endless belt, D, having a series of small cups or receptacles, *a a*, fixed or attached to its exterior surface, is arranged so as to travel around upon horizontal cylinders or rollers E F, the lower roller, F, being revolved by means of a crossed belt, G, (see Figs. 1, 2,) running upon a cone, H, of grooved pulleys fixed upon one extremity of the axis of the roller F, the said belt leading from another, but reversed cone, I, of pulleys applied upon the shaft or axis of the furrow-roller K, to be hereinafter described.

As the machine is moved upon the ground the endless belt is put in motion, and the seeds in the hopper, by means of the jarring and shaking of the machine, are caused to pass, as wanted, into the supplying-chamber, where they will stand generally at a lower level than in the hopper, and at such level or altitude in the said supplying-chamber as required for the action of the belt of cups. The revolution of the belt causes the cups to be successively filled with seed as they pass under the roller F, and to be discharged as they pass over the roller E, the seed being thrown into the discharging-passage L, down which they fall by the action of gravity, and in their fall strike upon the edge or upper surface of a bell, M, (which extends a short distance into the passage L, as seen in Fig. 4,) and thus by the noise created thereby give information of the dropping of the seed. The discharging-passage is formed through the angular surface or clearing-board N, on which the above-mentioned apparatus is sustained, and the said discharging-passage terminates just in the rear of a furrow-opener or small plow, O, secured to the under side of the clearing-board N, as seen in Figs. 2, 3, 4.

The board N has its front end formed angular, as seen in Figs. 1, 2, and 4, its angular faces or sides being shod or protected by bars or plates of iron suitably applied thereto. At a proper distance in rear of the furrow-plow two coverers, P Q, are applied to the lower side of the surface-board N, their office being to return into the furrow the earth thrown up by the plow.

The roller K, which compresses or rolls down the soil, is situated in rear of the coverers and the surface-board N. It is sustained by arms R R, which at their front ends are jointed to supports S S, so as readily to move up and down in a vertical direction, and thus permit the roller K to always rest upon the surface of the ground.

Handles T T are applied to the rear of the surface-board, and extend above the same, as seen in the drawings. A drag-beam, V, is connected to the front end of the surface-board, the horse or animal, by the power of which the machine is moved over the surface of the ground, being connected by a chain or other suitable means to the front end of the drag-beam.

The flat angular surface-board N clears the surface of the track of all obstructions to the correct action of the furrow-opener and coverers. Besides, it gages the depth to which the soil is to be penetrated, and is of advantage in many other respects.

I claim—

1. The combination, with the endless belt and discharging-passage, of the bell upon which the seeds are thrown, in the manner and for the purpose described.

2. The combination of the flat angular clearing and surface board with the angular furrow-plow and coverers arranged upon its lower surface, the object of the said clearing-board being to remove any impediment to the correct action of the furrow-opener and coverers and to regulate the depth to which the seeds are to be planted.

In testimony that the above is a correct specification of my said invention I have hereto set my signature this 23d day of September, of the year 1843.

HENRY TODD.

Witnesses:
 MARY M. WILCOX,
 LEONARD WILCOX.